Patented May 2, 1933

1,907,406

UNITED STATES PATENT OFFICE

LEON LILIENFELD, OF VIENNA, AUSTRIA

MANUFACTURE OF VISCOSE FROM CELLULOSE

No Drawing. Application filed March 11, 1929, Serial No. 346,268, and in Austria March 20, 1928.

It is generally assumed that high temperatures must be avoided in the preparation of alkali cellulose for the manufacture of viscose, since hot solutions of alkali have a tendency to cause degradation of the cellulose molecule. For this reason, particular care is taken in the viscose industry, when making viscose for the manufacture of artificial materials such as viscose silk, films, ribbons, plates or bands, artificial straw, or artificial hair, that in the preparation of the alkali cellulose, that is the impregnation of the cellulose with alkali solution, pressing, comminuting the alkali cellulose, and maturing, (when this is adopted), the temperature of the mass should not rise appreciably above room temperature. Proposals have even been made to prepare the alkali cellulose at a temperature below room temperature, and even below 0° C.

I have found that the use of higher temperatures, which may even exceed 100° C., in the manufacture of alkali cellulose not only has no deleterious influence on the properties of the viscose made from the alkali cellulose, but is actually advantageous both in connection with the manufacture of the viscose from the alkali cellulose and with the quality of the viscose itself, provided that the time of maintaining the raised temperature be not too long.

As regards the manufacture of the viscose, the use of higher temperatures in the production of the alkali cellulose permits the maturing of the alkali cellulose to be carried out in a shorter time, and may in some cases render it altogether unnecessary. Viscose made from alkali cellulose prepared at a high temperature is of improved quality, in particular in respect of the strength of the artificial materials, such as artificial fibres or films, made from it.

According to the invention, therefore, the preparation of alkali cellulose to be used for making viscose is conducted in such a manner that during at least part of the preparation, the temperature exceeds 80° C. or even 100° C. If the high temperature is maintained for a short time only (for example for 1 to 2 minutes) and the subsequent cooling quick, temperatures up to 160° C. may be employed in the process.

The aforesaid temperature may be applied at any stage of the preparation of alkali cellulose. For example, the cellulose may be impregnated with, or steeped in a solution of alkali of the required temperature: or after the impregnation or steeping, the mixture of cellulose and alkali solution may be heated to the desired temperature, whilst an excess of the alkali solution is still present: or the excess of the alkali solution may first be removed by pressing, centrifuging or the like, and the residue heated to the desired temperature. It is, of course, within the scope of the invention to apply the aforesaid temperature in two or more stages of the preparation of alkali cellulose, and to maintain the temperature throughout the stage or stages or for any suitable portion of any stage or stages.

The alkali cellulose made in accordance with the invention is converted into viscose according to any known method, and the viscose is then worked up into artificial material. In the latter operation, the viscose may be brought into any desired form, such as a fibre, film, ribbon, plate or the like, and treated in order to cause coagulation, with regeneration of cellulose, by means of any known precipitating agent, such as an acid, or a mixture of an acid and a salt, or an acid salt, or by heating or steaming. Particularly suitable precipitating baths for the purpose are those containing or consisting of a strong mineral acid, such as are described in U. S. Patents Nos. 1,683,199 and 1,683,200, especially precipitating baths containing not less than 55 per cent. and preferably not less than 65 per cent. of sulphuric acid monohydrate.

The following examples illustrate the invention, the parts being by weight:—

1. 400 parts of wood-cellulose of the quality usual in viscose manufacture, and having a water content of 7.5 to 9.0 per cent. are quickly introduced in about half a minute to five minutes into 8000 parts of a caustic soda solution of 18 per cent. strength, having a temperature of 106° C. whilst stirring.

As soon as the whole of the cellulose has been introduced the containing vessel is placed in ice and the contents further stirred until the temperature of the cellulose and the alkali reaction mixture has fallen to 15° C. The cooling operation should occupy about 2 hours, the temperature falling to 40° C. in about an hour and to 15° C. after a further hour.

The reaction mixture is then allowed to stand at room temperature for 3 hours, and is then pressed until its weight is 1200 parts, this operation requiring about 35 minutes. The pressed material is comminuted for 3 hours, and the comminuted mass is treated with 160 parts of carbon disulphide for 10 hours at room temperature, whereupon the excess of carbon disulphide is removed by means of a current of air. After about 15 minutes, the removal of the excess of carbon disulphide is complete, and the residue (cellulose xanthate) is dissolved in caustic soda solution so as to produce a solution containing 8 per cent. of caustic soda and a quantity of xanthate corresponding with 7 to 8 per cent. of parent cellulose. The actual cellulose content of the viscose as determined by analysis is 5.5 to 6.5 per cent.

The viscose so produced is worked up in any known manner into artificial objects, such as artificial fibres, hair, ribbons, plates or laminæ, films or the like, or into coatings, dressing layers on fabrics, printed layers or the like, for example, the viscose may be discharged through an orifice of suitable shape into a known "Müller bath" (for example, as disclosed in U. S. Patent No. 836,452 or German Patent No. 287,955), or into a bath of the kind referred to in U. S. Patent No. 1,683,199, containing 60 to 70 per cent. of sulphuric acid.

2. The proceduce is as in Example 1, with the exception that instead of wood-cellulose, the parent material is linters having a water content of 6.5 to 7 per cent., that the alkali cellulose is pressed until its weight is 1360 parts, and that the quantity of carbon disulphide used is 240 parts.

3. The procedure is as in Example 1 or Example 2, with the exception that the mixture of cellulose and hot alkali solution, instead of being cooled immediately after introduction of the cellulose, is allowed to stand for half-an-hour and is then cooled in the manner described in Example 1.

4. The procedure is as in any of the preceding examples, with the exception that the caustic soda solution has initially a temperature of 15° C. and after introduction of the cellulose, the whole is quickly heated in about 5 to 30 minutes to 100° C. Cooling and further treatment are conducted as in any of the preceding examples.

5. The procedure is as in Example 1, with the exception that the caustic soda solution has initially a temperature of 15° C. and no heat is applied to the mixture of cellulose and caustic soda until after comminution: the pressed and comminuted mass is heated to 100 to 106° C. in a well closed vessel, this temperature is maintained for 1 to 5 minutes, and then the whole is quickly cooled in about 1 to 2 hours by external cooling. Treatment with carbon disulphide and dissolution occur as in the preceding examples.

6. The procedure is as in Example 1, with the exception that as soon as introduction of cellulose into the alkali solution at 106° C. is complete, the mixture is introduced into a rotary autoclave preheated and heated to such a temperature, that the mixture of cellulose and hot alkali solution attains a temperature of 125 to 130° C. within 2 to 3 minutes. The contents of the autoclave are then immediately removed, and are quickly cooled and converted into viscose as in Example 1.

7. The procedure is as in any of the preceding examples, with the exception that the soda-cellulose is allowed to mature for 36 hours at room temperature before being treated with carbon disulphide.

8. The procedure is as in any of Examples 1 to 3 or 7, with the exception that for making the alkali cellulose, there is used a caustic soda solution of 30 per cent. strength having a temperature of 120° C. and that the quantity of carbon disulphide used is 280 parts when the parent material is wood-cellulose, or 320 parts when the parent material is linters.

I claim:

1. The process of manufacturing of artificial materials of regenerated cellulose, which comprises bringing into the form of an artificial material viscose made from alkali cellulose suitable for the preparation of viscose and which during at least a part of its preparation has been exposed to a temperature higher than about 80° C., and treating the formed viscose with an agent adapted to regenerate cellulose from viscose.

2. The process of manufacturing of artificial materials of regenerated cellulose, which comprises bringing into the form of an artificial material viscose made from alkali cellulose suitable for the preparation of viscose and which during at least a part of its preparation has been exposed to a temperature higher than about 100° C., and treating the formed viscose with an agent adapted to regenerate cellulose from viscose.

3. The process of manufacturing of artificial materials of regenerated cellulose, which comprises bringing into the form of an artificial material viscose made from alkali cellulose suitable for the preparation of viscose and which during at least a part of its preparation has been exposed to a temperature between about 100 and about 160° C., and treating the formed viscose with an agent adapted to regenerate cellulose from viscose.

4. The process of preparing viscose which comprises subjecting cellulose to the action of caustic alkali solution and applying during at least a part of said treatment a temperature in excess of about 80° C., said caustic alkali solution being of a concentration suitable for preparing alkali cellulose for the manufacture of viscose, and arresting the action of the elevated temperature before the utility of the alkali cellulose for the preparation of viscose is destroyed, and thereafter converting the alkali cellulose into viscose.

5. The process of preparing viscose which comprises subjecting cellulose to the action of caustic alkali solution and applying during at least a part of said treatment a temperature in excess of about 100° C., said caustic alkali solution being of a concentration suitable for preparing alkali cellulose for the manufacture of viscose, and arresting the action of the elevated temperature before the utility of the alkali cellulose for the preparation of viscose is destroyed, and thereafter converting the alkali cellulose into viscose.

6. The process of preparing viscose which comprises subjecting cellulose to the action of caustic alkali solution and applying during at least a part of said treatment a temperature between about 100° C. and about 160° C., said caustic alkali solution being of a concentration suitable for preparing alkali cellulose for the manufacture of viscose, and arresting the action of the elevated temperature before the utility of the alkali cellulose for the preparation of viscose is destroyed, and thereafter converting the alkali cellulose into viscose.

7. The process of preparing viscose which comprises impregnating cellulose with a caustic alkali solution of a concentration suitable for preparing alkali cellulose for the manufacture of viscose, removing part of the liquid from the impregnated cellulose, exposing the resulting cellulosic mass to a temperature higher than about 80° C., arresting the action of the elevated temperature before the utility of the alkali cellulose for the preparation of viscose is destroyed, and thereafter converting the alkali cellulose into viscose.

8. The process of preparing viscose which comprises impregnating cellulose with a caustic alkali solution of a concentration suitable for preparing alkali cellulose for the manufacture of viscose, removing part of the liquid from the impregnated cellulose, exposing the resulting cellulosic mass to a temperature higher than about 100° C., arresting the action of the elevated temperature before the utility of the alkali cellulose for the preparation of viscose is destroyed, and thereafter converting the alkali cellulose into viscose.

9. The process of preparing viscose which comprises impregnating cellulose with a caustic alkali solution of a concentration suitable for the manufacture of viscose, removing part of the liquid from the impregnated cellulose, exposing the resulting cellulosic mass to a temperature between about 100° C. and 160° C., arresting the action of the elevated temperature before the utility of the alkali cellulose for the preparation of viscose is destroyed, and thereafter converting the alkali cellulose into viscose.

In testimony whereof I affix my signature.

LEON LILIENFELD.